United States Patent
Bolton

(10) Patent No.: US 10,922,040 B2
(45) Date of Patent: Feb. 16, 2021

(54) DISPLAYING DATA BY A DISPLAY SYSTEM

(71) Applicant: GE Aviation Systems Limited, Cheltenham (GB)

(72) Inventor: Luke Patrick Bolton, Cheltenham (GB)

(73) Assignee: GE Aviation Systems Limited, Cheltenham (GB)

( * ) Notice: Subject to any disclaimer, the term of this patent is extended or adjusted under 35 U.S.C. 154(b) by 0 days.

(21) Appl. No.: 15/594,928

(22) Filed: May 15, 2017

(65) Prior Publication Data

US 2017/0337030 A1    Nov. 23, 2017

(30) Foreign Application Priority Data

May 20, 2016  (GB) ..................................... 1608957

(51) Int. Cl.
| | | |
|---|---|---|
| G06F 3/14 | (2006.01) | |
| B64D 43/00 | (2006.01) | |
| G09F 21/08 | (2006.01) | |
| B64D 43/02 | (2006.01) | |
| G09F 9/33 | (2006.01) | |
| G09F 9/35 | (2006.01) | |

(52) U.S. Cl.
CPC ........... *G06F 3/1446* (2013.01); *B64D 43/00* (2013.01); *B64D 43/02* (2013.01); *G09F 21/08* (2013.01); *G09F 9/33* (2013.01); *G09F 9/35* (2013.01)

(58) Field of Classification Search
CPC . G06F 3/147; G09F 9/00; G09G 3/18; H03M 11/18; Y10S 345/904
See application file for complete search history.

(56) References Cited

U.S. PATENT DOCUMENTS

| | | | |
|---|---|---|---|
| 4,562,433 | A | 12/1985 | Biferno |
| 4,568,928 | A | 2/1986 | Biferno |
| 4,656,466 | A | 4/1987 | Yoshida et al. |
| 6,281,810 | B1 | 8/2001 | Factor |

(Continued)

FOREIGN PATENT DOCUMENTS

| | | |
|---|---|---|
| GB | 2107059 A | 4/1983 |
| GB | 2501255 A | 10/2013 |

(Continued)

OTHER PUBLICATIONS

GB Combined Search Report and Examination Report issued in connection with corresponding GB Application No. 1608957.5 dated Sep. 26, 2016.

(Continued)

*Primary Examiner* — Robin J Mishler
(74) *Attorney, Agent, or Firm* — Dority & Manning, P.A.

(57) ABSTRACT

Systems and methods of displaying data are provided. For instance, a display system associated with a vehicle can include a first display implemented within a display housing, a transparent cover disposed over the first display device, and a second display device implemented within the display housing. The second display device overlays at least a portion of the first display device. The display system can further include one or more control devices configured to provide for display first display data on the first display device, and to provide for display second display data on the second display device.

20 Claims, 3 Drawing Sheets

(56) References Cited

U.S. PATENT DOCUMENTS

| | | | |
|---|---|---|---|
| 7,030,892 | B1 | 4/2006 | Gyde et al. |
| 7,190,390 | B2 | 3/2007 | Hett et al. |
| 7,465,079 | B1 | 12/2008 | Cull et al. |
| 7,999,759 | B2 | 8/2011 | Selbrede |
| 9,239,461 | B2 | 1/2016 | Manjon Sanchez |
| 2005/0073471 | A1 | 4/2005 | Selbrede |
| 2009/0298546 | A1* | 12/2009 | Kim ............... G06F 1/1616 455/566 |
| 2012/0140125 | A1 | 6/2012 | Pepitone et al. |
| 2014/0035942 | A1* | 2/2014 | Yun ............... G09G 5/006 345/592 |
| 2014/0306862 | A1 | 10/2014 | Manochio |
| 2015/0138239 | A1* | 5/2015 | Kim ............... H04N 9/3185 345/634 |
| 2015/0262545 | A1 | 9/2015 | Kneuper et al. |
| 2016/0278611 | A1* | 9/2016 | Power ............... A61B 1/04 |

FOREIGN PATENT DOCUMENTS

| | | |
|---|---|---|
| WO | 2007/060666 A1 | 5/2007 |
| WO | 2012112090 A | 8/2012 |
| WO | WO2014/153396 A1 | 9/2014 |
| WO | 2015006171 A | 1/2015 |

OTHER PUBLICATIONS

Chandler, D.L., "Seeing things: A new transparent display system could provide heads-up data," MIT News, Retrieved from the Internet URL: http://news.mit.edu/2014/seeing-things-a-new-transparent-display-system-could-provide-heads-up-data-0121, on Jun. 5, 2018, pp. 1-3 (Jan. 21, 2014).

Digital Displays for Professional Applications, LCD & LED Digital Wall Displays & Signage Solutions, Retrieved from the Internet URL: www.planar.com, on Jun. 5, 2018, pp. 1-9 (2018).

"Sun Innovations," Retrieved from the Internet URL: http://sun-innovations.com/, on Jun. 5, 2018, p. 1 (2016).

Extended European Search Report and Opinion issued in connection with corresponding EP Application No. 17171236.7 dated Sep. 26, 2017.

Office Action issued in connection with corresponding CA Application No. 2966682 dated Mar. 7, 2018.

Canadian Office Action Corresponding to Application No. 2966682 dated Mar. 12, 2020.

* cited by examiner

DISPLAYING DATA BY A DISPLAY SYSTEM

FIELD OF THE INVENTION

The present subject matter relates generally aircraft display systems and more particularly to a displaying data by multiple display devices in a display system.

BACKGROUND OF THE INVENTION

Data related to aircraft conditions, performance tracking, and/or health monitoring for aircraft are generally available. Analysis of such aviation data can offer useful information for maintenance, prognostics, control, routing, and/or other objectives of the aircraft.

For example, modern aircraft are equipped with one or more computing devices that provide a wide range of control functions and that output various data. Aircraft may also have a large number of sensors that provide data regarding various conditions associated with the aircraft, including vibrational data, engine data, wind data, or other forms of aircraft condition data.

Such data can be displayed, for instance, by a cockpit display system or other display system associated with the aircraft. During normal operation of the aircraft, the data can be displayed by one or more display devices associated with the cockpit display system. In the event of a failure of a display device, standby data may be displayed by a standby display device. For instance, such standby data can include essential information in accordance with which the aircraft can be flown. Such standby devices can be a mandatory safety feature.

Conventional standby devices are commonly separate displays configured to display the standby data in the event of a failure to one or more primary display devices. Such standby displays can require separate housing and cabling, and thereby can require additional space within the aircraft.

BRIEF DESCRIPTION OF THE INVENTION

Aspects and advantages of embodiments of the present disclosure will be set forth in part in the following description, or may be learned from the description, or may be learned through practice of the embodiments.

One example embodiment of the present disclosure is directed to a display system associated with a vehicle. The display system includes a first display device implemented within a display housing. The display system further includes a transparent cover disposed over the first display device. The display system further includes a second display device implemented within the display housing. The second display device overlays at least a portion of the first display device. The display system further includes one or more control devices configured provide for display first display data on the first display device, and to provide for display second display data on the second display device.

Another example aspect of the present disclosure is directed to an aircraft. The aircraft includes one or more display systems. Each display system includes a first display device implemented within a display housing. Each display system further includes a transparent cover disposed over the first display device. Each display system further includes a second display device implemented within the display housing. The second display device overlays at least a portion of the first display device. Each display system further includes one or more control devices configured to provide for display first display data on the first display device, and to provide for display second display data on the second display device.

Yet another example aspect of the present disclosure is directed to a method of displaying data by a display system. The method includes providing for display first display data by a first display device associated with a display system. The first display device is implemented within a display housing. The method further includes receiving one or more signals indicative of a failure of the first display device. The method further includes, responsive to receiving the one or more signals indicative of the failure of the first display device, providing for display second display data on a second display device. The second display device is implemented within the display housing. The second display device overlays at least a portion of the first display device.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
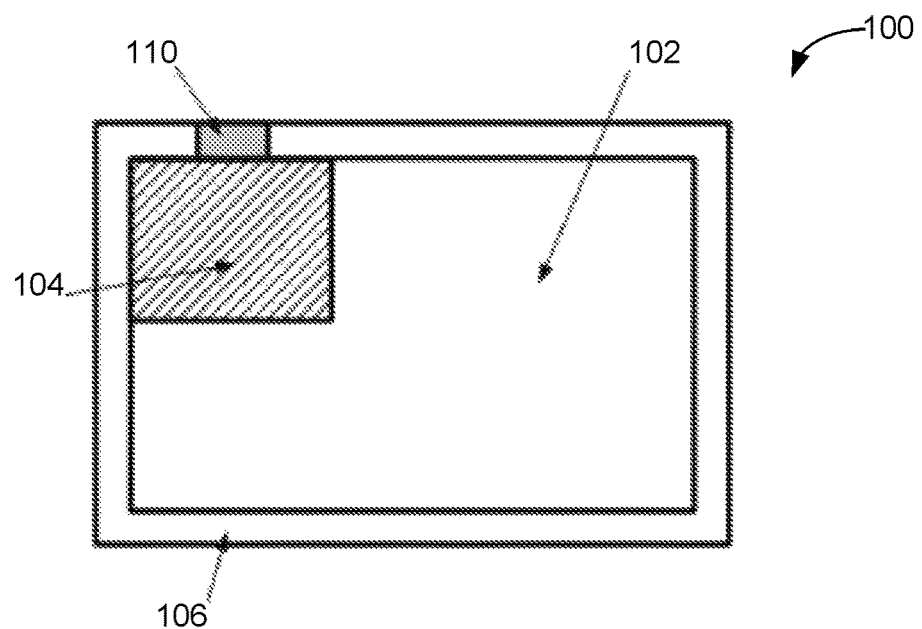
FIG. 1 depicts a front view of an example display system according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods of displaying data associated with a vehicle, such as for instance, an aircraft, automobile, train, nautical vehicle, or other suitable vehicle. For instance, a display system can include a first display device integrated within a display housing. The display system can further include a transparent (e.g. glass or other suitable transparent material) cover disposed over the first display device. The display system can further include a second display device integrated within the display housing. The second display device can overlay at least a portion of the first display device. For instance, in some implementations, the second display device can be integrated within the transparent cover. In alternative implementations, the second display device can be an additional layer disposed over at least a portion of the transparent cover. The display system can be configured to provide for display first display data on the first display device, and second display data on the second display device.

The first display data can include operational data associated with the vehicle. For instance, in implementations wherein the display system is associated with an aircraft, the first display data can include operational data associated with the aircraft and/or the flight of the aircraft. For instance, the first display data can include one or more parameters associated with the aircraft (e.g. fuel levels, engine oil pressure, flight trajectories, aircraft speed, wind speed, altitude, aircraft location, aircraft orientation, and/or any other suitable data). In some implementations, the first display data and/or the second display data can be determined based at least in part on a user input. For instance, the user can interact with a user interface associated with the display system to prompt the display system to display various data. In some implementations, the second display data can be different than the first display data, such as any suitable display data not included in the first display data. For instance, in some implementations, the second display data can include standby data displayed in the response to a failure of the first display device. In this manner, the second display device can act as a backup display device to the first display device.

In some implementations, the first display device can be a liquid crystal display device. In some implementations, the second display device can be a transparent display device. For instance, the second display device can be an OLED display device, LCD display device, nanoparticle display device, laser projected display device, and/or other suitable transparent display device. In this manner, overlaying the second display device over at least a portion of the first display device may not completely occlude a view of the first display device. As indicated, the transparent display device can be integrated within the transparent cover that is disposed over the first display device, or can be provided as an additional layer disposed over at least a portion of the transparent cover. For instance, in implementations wherein the transparent display is integrated within the cover, an array of display elements (e.g. OLEDS, nanoparticles, etc.) can be embedded or otherwise integrated within one or more layers of the cover. In implementations wherein the transparent display is provided as an additional layer, the transparent display can be attached or otherwise disposed over the transparent cover, such that the transparent display overlays at least a portion of the first display device. As an example, the transparent display can be a thin plastic coating applied or attached to the transparent cover.

In some implementations, the display system can include a projection device configured to project images corresponding to the second display data onto the second display device. For instance, the projection device can be included in the display system in implementations wherein the second display device is a nanoparticle display device, laser-projected display device or other suitable display device requiring a projection device. The projection device can be a short-throw projection device. The projection device can be positioned with respect to the second display device, such that the projector can project suitable display images to the second display device. In some implementations, the projection device can be contained within the display housing. In alternative implementations, the projection device can be external to the display housing.

The display system can include or otherwise be associated with one or more control devices configured to provide the first and second display data for display on the first and second display devices, respectively. In some implementations, the first and second display devices can simultaneously display the first and second data. In some implementations, the second display device can be used as a standby display configured to display standby data in response to a failure of the first display device. For instance, the one or more control devices can provide for display the first data on the first display device. In the event of a failure of the first display device, one or more signals indicative of the failure can be received. For instance, the one or more signals indicative of the failure can be associated with a user input indicative of a request to display the standby data in the event of a failure of the first display device. In some implementations, a failure of the first display device can be automatically detected by the one or more control devices, and the one or more signals indicative of the failure can be associated with such automatic detection. In response to receiving the one or more signals indicative of the failure, the one or more control devices can provide for display the second display data (e.g. standby data) on the second display device. The control device(s) can further power down the first display device.

With reference now to the figures, example aspects of the present disclosure will be discussed in greater detail. For instance, FIGS. 1 and 2 respectively depict a front view and a side view of an example display system 100 according to example embodiments of the present disclosure. In some implementations, display system 100 can be associated with a cockpit display system associated with an aircraft. In some implementations, display system 100 can be associated with display systems in other suitable vehicles. Display system 100 includes a first display device 102 and a second display device 104 implemented within a display housing 106. As shown in FIG. 2, first display device 102 can be positioned behind a transparent cover 108. Transparent cover 108 can be made of any suitable transparent material, such as glass, plastic and/or other suitable transparent material. As indicated above, first display device 102 can be an LCD display device or other suitable display device (e.g. LED, OLED, CRT, etc.). Second display device 104 can be a transparent display device. In some implementations, the transparent display device can include an array of display elements (e.g. OLEDs, nanoparticles, etc.) integrated or embedded within transparent cover 108. In some implementations, second display device 104 can be a separate and distinct component from transparent cover 108. For instance, second display device 104 can be provided as an additional layer disposed over at least a portion of transparent cover 108. As another example, second display device 104 can be a separate component disposed along a common plane with transparent cover 108. In such implementations, second display device 108 can be disposed adjacent to transparent cover 108 and directly over at least a portion of first display device 102.

Figure 2:
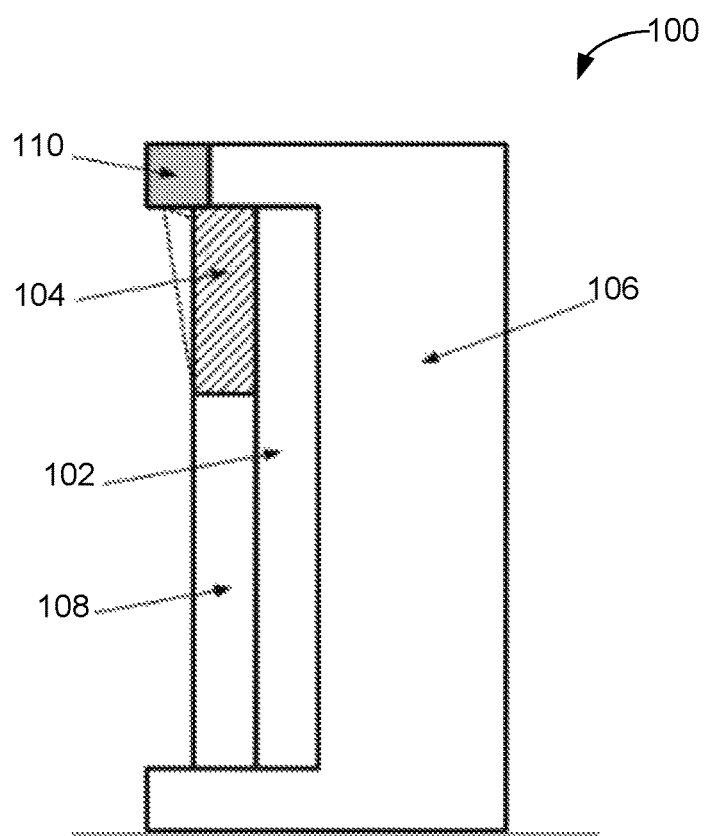
FIG. 2 depicts a side view of the example display system according to example embodiments of the present disclosure.

It will be appreciated that second display device 104 as depicted in FIGS. 1 and 2 is intended for illustrative purposes only. In particular, it will be appreciated that second display device 104 can be various other suitable sizes, and located in various other suitable positions relative to transparent cover 108 and/or first display device 102. For instance, in some implementations, second display device 104 have the same height and width as first display device 104 and/or transparent display 108, such that second display device 104 overlays the entirety of first display device 102. As another example, second display device 104 can be positioned in the bottom left corner, bottom right corner, top right corner, or other suitable location associated with first display device 102 and/or transparent cover 108 without deviating from the scope of the present disclosure.

As indicated, second display device 104 can be a transparent display device. In particular, the transparent display device can be configured to display data on a transparent surface of the device. Such transparent display device can be configured to display an image while being transparent to ambient light. In this manner, a viewer of the transparent display device may be able to view the displayed data while still being able to see through the transparent display device (e.g. to see through to first display device 102). When the transparent display device is powered off or otherwise not displaying data, the transparent display device can be substantially transparent, such that first display device 102 can be viewed by a user.

As shown, system 100 further includes a projection device 110 located proximate second display device 104. Projection device 110 can be integrated within display housing 106, or can be external to display housing 106. In particular, projection device 110 can be positioned with respect to second display device 104 such that projection device 110 can project imagery 112 onto a surface of second display device 104. In this manner, projection device 110 can be positioned based at least in part on a throw ratio of projection device 110.

It will be appreciated that, in implementations wherein second display device 104 is not a projection-based display device, projection device 110 may not be included within system 100. For instance, in implementations wherein second display device 104 is an OLED device or other suitable non-projection-based device, projection device 110 may not be included in system 100. Further, in implementations wherein projection device 110 is included in system 100, projection device 110 can be any suitable projection device configured to project suitable imagery onto a surface of second display device 104.

Figure 3:
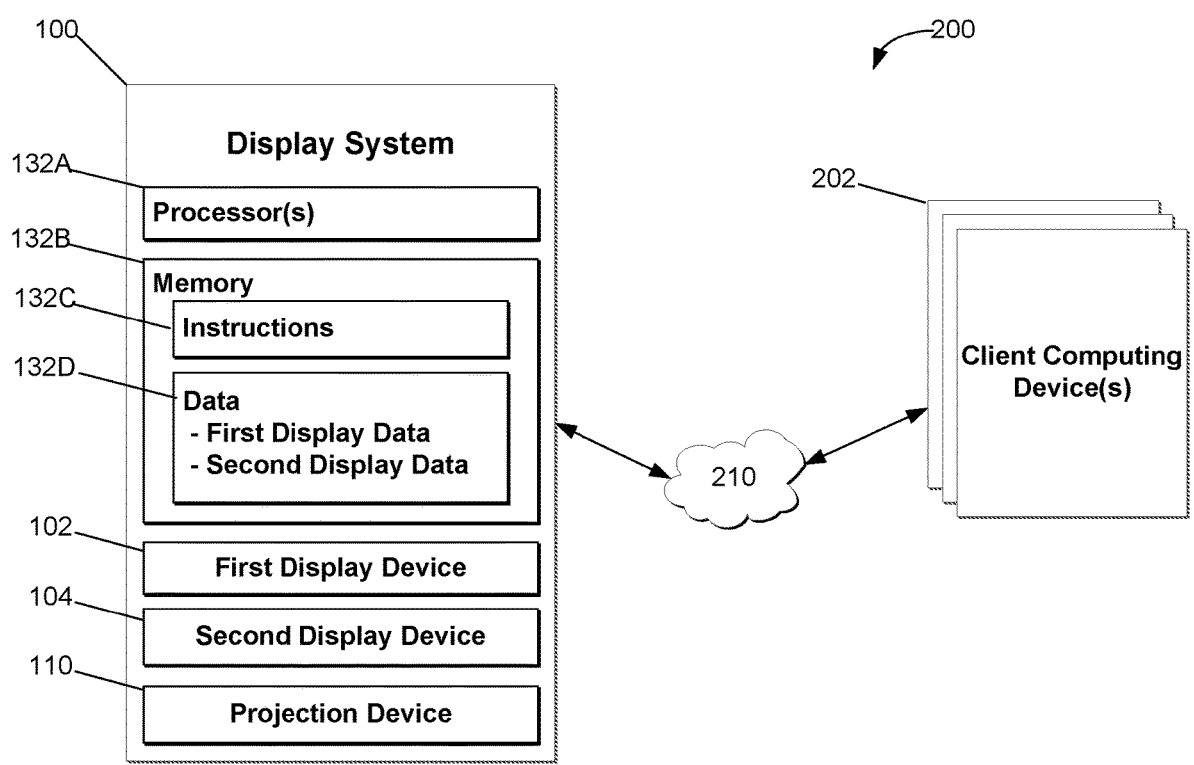
FIG. 3 depicts a block diagram of an example system for displaying data according to example embodiments of the present disclosure.

As indicated above, display system 100 can be configured to display various display data by first display device 102 and second display device 104. For instance, FIG. 3 depicts an example system 200 for displaying data according to example embodiments of the present disclosure. As shown, system 200 includes display system 100, and one or more client computing devices 202. Client computing device(s) 202 can host or otherwise be associated with one or more applications, (e.g. user applications) such as a flight management system, weather system, positioning system, onboard system, navigation system, and/or other suitable application. Display system 100 and client computing device(s) 202 can be configured to communicate via a wired and/or wireless network 210. Network 210 can include any suitable communications network for transmitting signals associated with an aircraft or other vehicle in which system 200 is implemented. As shown, display system 100 can include one or more processor(s) 132A and one or more memory device(s) 132B. The one or more processor(s) 132A can include any suitable processing device, such as a microprocessor, microcontroller, integrated circuit, logic device, or other suitable processing device. The one or more memory device(s) 132B can include one or more computer-readable media, including, but not limited to, non-transitory computer-readable media, RAM, ROM, hard drives, flash drives, or other memory devices.

The one or more memory device(s) 132B can store information accessible by the one or more processor(s) 132A, including computer-readable instructions 132C that can be executed by the one or more processor(s) 132A. The instructions 132C can be any set of instructions that when executed by the one or more processor(s) 132A, cause the one or more processor(s) 132A to perform operations. The instructions 132C can be software written in any suitable programming language or can be implemented in hardware. In some embodiments, the instructions 132C can be executed by the one or more processor(s) 132A to cause the one or more processor(s) 132A to perform operations, such as operations for displaying first and second data on first display device 102 and second display device 104, respectively, and/or other operations.

The memory device(s) 132B can further store data 132D that can be accessed by the processors 132A. For example, the data 132D can include first display data and second display data. In some implementations, the first display data can be associated with a first memory device, and the second display data can be associated with a second memory device.

Display system 100 can also include a network interface used to communicate, for example, with the other components of system 200. The network interface can include any suitable components for interfacing with one or more network(s), including for example, transmitters, receivers, ports, controllers, antennas, or other suitable components.

According to example aspects of the present disclosure, display system 100 can be configured to display data received from client computing device(s) 202. In particular, display system 100 can be configured to display first display data by first display device 102 and second display data by second display device 104. The first and second display data can be received from one or more client computing devices 202. In some implementations, first display data can be primary display data displayed during normal operation of the aircraft (e.g. data related to fuel levels, engine oil pressure, flight trajectories, aircraft speed, wind speed, altitude, aircraft location, aircraft orientation, and/or other suitable data). In some implementations, second display data can be standby data displayed in response to a failure of first display device 102. For instance, display system 100 can be configured to detect a failure of first display device 102. In response to the detected failure, display system 100 can be configured to display second display data (e.g. standby data) by second display device 104. The standby data can be the same data as the primary data previously displayed by first display device 102, or the standby data can be different data.

In some implementations, display system 100 can be configured to display the second display data in response to a user input indicative of a request to display the second display data. In some implementations, the user input can be indicative of a failure of first display device 102. For instance, the user may interact with a user interface associated with display system 100 to prompt display system 100 to display standby data in the event of a failure of first display device 102. In response to the user input, display system 100 can display the standby data. In some implementations, display system 100 can further cease operation (e.g. power off) of first display device 102.

In some implementations, display system 100 can be configured to display the first and second display data (e.g. by first display device 102 and second display device 104, respectively) simultaneously. In such implementations, the configuration of the displayed data (e.g. amount, position, size, color, etc.) can be determined such that a viewer can easily view and distinguish the first and second display data. For instance, the configuration of the displayed data can be determined such that the first and second display data do not overlap. In such implementations, the first and second display data can be the same data or different data.

As indicated above, in implementations wherein second display device 104 is a transparent display device, the device may be substantially transparent when not displaying data. Further, when the transparent display device is displaying data, the non-displaying portions of the device can be transparent. In manner, the transparent display device can allow ambient light to pass through the device.

In implementations wherein second display device 104 is a projected display device, display system 100 can be configured to control operation of projection device 110 to project imagery associated with the second display data onto a surface of second display device 104. For instance, in response to a failure of first display device 102 (and/or a user input), display system 100 can control operation of projection device 110 to project the imagery associated with the second display data onto the surface of second display device 104.

Figure 4:
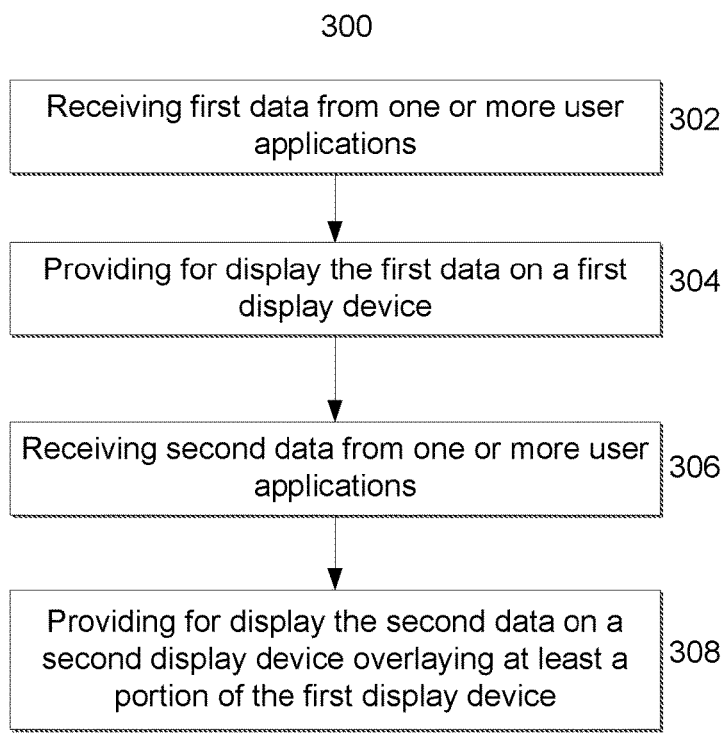
FIG. 4 depicts a flow diagram of an example method of displaying data by a display system according to example embodiments of the present disclosure.

FIG. 4 depicts a flow diagram of an example method (300) of displaying data by a display system according to example embodiments of the present disclosure. Method (300) can be implemented by one or more computing devices, such as one or more of the computing devices depicted in FIG. 3. In addition, FIG. 4 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (302), method (300) can include receiving first display data from one or more user applications. As indicated, a user application may be hosted or otherwise associated with one or more client computing devices communicatively coupled to a display system. In some implementations, the display system can be associated with a vehicle, such as a cockpit display system associated with an aircraft including one or more display units. The user application(s) can be configured to determine data and to provide the data to the display system. As indicated, the data may include one or more parameters or metrics associated with the aircraft, the flight of the aircraft, and/or other suitable parameters or metrics. In some implementations, the data may be determined based at least in part on a user input. For instance, a user, such as a pilot, copilot, crew member, etc. associated with the aircraft can interact with a user interface associated with the display system to select data to be displayed by the display system. The user application(s) may determine the selected data and provide the selected data to the display system.

At (304), method (300) can include providing for display the first display data on a first display device. As indicated, the first display device can be an LCD device or other display device. For instance, the first display device can be integrated within a display housing.

At (306), method (300) can include receiving second display data from one or more user applications. The second data can be the same display data as the first display data, or can be different data. For instance, the second display data can be standby data associated with the aircraft. In some implementations, similar to the first display data, the second display data can be determined based at least in part on a user input.

At (308), method (300) can include providing for display the second display data on a second display device overlaying at least a portion of the first display device. For instance, the second display device can be a transparent display device associated with a transparent (or substantially transparent) material. For instance, the transparent display device can be a transparent OLED device, a laser projected device, a nanoparticle device, a heads up device, and/or other suitable transparent display device. In some implementations, the second display device can be implemented within a transparent cover disposed over the first display device within the display housing. For instance, an array of transparent display elements and/or transparent electronics can be embedded or otherwise integrated within the transparent cover. In this manner, the second display device and the transparent cover can define a single body. In alternative implementations, the second display device can be a separate and distinct component from the transparent cover. For instance, the second display device can be provided as an additional layer disposed over at least a portion of the cover. As another example, the second display device can be positioned adjacent to the transparent cover along a common plane within the display housing.

In some implementations, providing for display the second display data on the second display device can include controlling operation of a projection device to project imagery associated with the second display data onto a surface of the second display device. For instance, the projection device can be positioned with respect to the second display device such that the projection device can project suitable imagery onto the surface of second display device.

Figure 5:
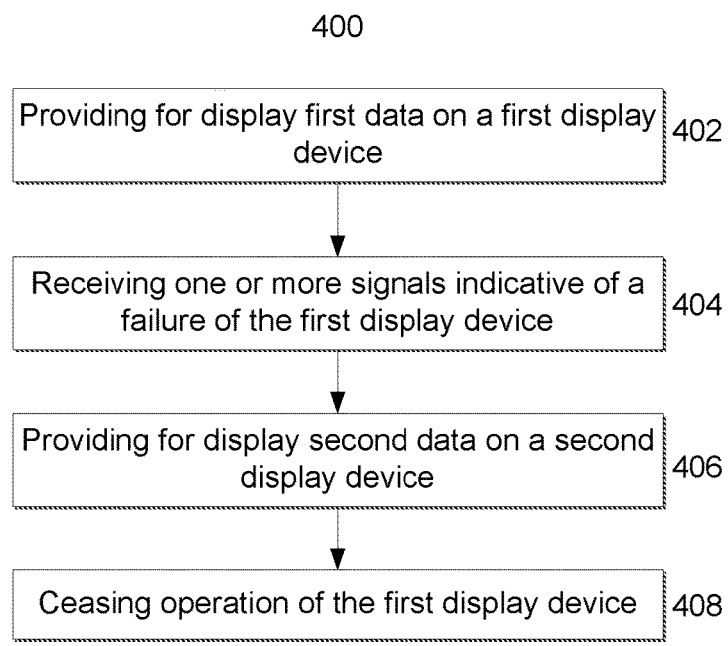
FIG. 5 depicts a flow diagram of an example method of displaying data by a display system according to example embodiments of the present disclosure.

As indicated above, in some implementations, the second display data can be standby data. For instance, FIG. 5 depicts a flow diagram of an example method (400) of displaying standby data associated with an aircraft according to example embodiments of the present disclosure. Method (400) can be implemented by one or more computing devices, such as one or more of the computing devices depicted in FIG. 3. In addition, FIG. 5 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (402), method (400) can include providing for display first display data on a first display device. For instance, the first display data can be a primary data displayed during normal operation of the aircraft. At (404), method (400) can include receiving one or more signals indicative of a failure of the first display device. For instance, the one or more signals can be provided in response to a detection of the failure by the display system, or the one or more signals can be provided in response to a user input indicative of a failure of the display system.

At (406), method (400) can include providing for display second data on a second display device. For instance, the second data can be provided for display on the second display device in response to receiving the one or more signals indicative of the failure. The second data can be standby data associated with the aircraft, the flight of the aircraft, etc. displayed in the event of a failure of one or more components (e.g. first display device or other component) associated with the aircraft.

At (408), method (400) can include ceasing operation of the first display device (e.g. powering off the first display device). For instance, operation of the first display device can be ceased in response to receiving the one or more signals indicative of the failure.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A display system associated with a vehicle, the display system comprising:
   a first display device implemented within a display housing;
   a transparent cover disposed over the first display device, wherein the first display device is positioned on a first side surface of the transparent cover along a first direction with respect to a viewer of the display system;
   a second display device implemented within the display housing and including a projector positioned at least partially forward of a second side surface of the transparent cover and at least partially rearward of the second side surface of the transparent cover along the first direction and configured to generate an image on the transparent cover from an opposing side of the transparent cover from the first display device, the second display device overlaying at least a portion of but equal to or less than a quarter of the first display device and wherein an entirety of the second display device overlays the first display device, and wherein the second display device is disposed along a common plane with the transparent cover, wherein the common plane is substantially perpendicular to the first direction, wherein the second display is not fully transparent but allows ambient light to pass therethrough so that the first display device is visible when the second display is not displaying data; and
   one or more control devices configured to provide for display of first display data on the first display device and to provide for display of second display data on the second display device.

2. The display system of claim 1, wherein the one or more control devices are further configured to receive one or more signals indicative of a failure of the first display device, wherein the one or more control devices are configured to provide for display the second display data responsive to receiving the one or more signals indicative of the failure of the first display device.

3. The display system of claim 2, wherein the one or more control devices are configured to power off the first display device responsive to receiving the one or more signals indicative of the failure of the first display device.

4. The display system of claim 2, wherein the second display data comprises standby data associated with an aircraft in which the display system is implemented.

5. The display system of claim 2, wherein the one or more signals indicative of a failure of the first display device are associated with a user input requesting a display of the second data.

6. The display system of claim 1, wherein the second display device overlays only a corner of the first display device.

7. The display system of claim 6, wherein the transparent display device comprises an OLED display device, LCD display device, nanoparticle display device, or a laser projected display device.

8. The display system of claim 1, wherein the second display device is integrated into at least a portion of the transparent cover.

9. The display system of claim 1, wherein the transparent cover and the second display device are directly adjacent and in front of the first display device along the first direction with respect to the viewer of the display system.

10. The display system of claim 1, wherein the display system is a cockpit display system, and wherein the cockpit display system further comprises a projection device configured to project one or more images to the second display device.

11. The display system of claim 10, wherein providing for display second display data on the second display device comprises controlling operation of the projection device to project the second display data to the second display device.

12. The display system of claim 10, wherein the projection device is implemented within the display housing.

13. The display system of claim 1, wherein the first display device is an LCD display device.

14. An aircraft comprising:
   one or more display systems, each display system comprising:
   a first display device implemented within a display housing;
   a transparent cover disposed over the first display device;
   a second display device implemented within the display housing, the second display device overlaying at least a portion of the first display device and including a projector positioned at least partially forward of a surface of the transparent cover and at least partially rearward of the surface of the transparent cover, the projector configured to generate an image on the transparent cover from an opposing side of the transparent cover from the first display device; and
   one or more control devices configured to provide for display of first display data on the first display device and to provide for display of second display data on the second display device,
   wherein the first and second display devices are configured to allow the first display data and the second display data to be displayed for viewing simultaneously.

15. The aircraft of claim 14, wherein the one or more control devices are further configured to receive one or more signals indicative of a failure of the first display device, wherein the one or more control devices are configured to provide for display the second display data responsive to receiving the one or more signals indicative of the failure of the first display device.

16. The aircraft of claim 14, wherein the second display device comprises a transparent display device.

17. The aircraft of claim 16, wherein the transparent display device comprises an OLED display device, LCD display device, nanoparticle display device, or a laser projected display device.

18. A method of displaying data by a display system onboard an aerial vehicle, the method comprising:
provides for display first display data by a first display device associated with a display system, the first display device implemented within a display housing;
receiving one or more signals indicative of a failure of the first display device; and
responsive to receiving the one or more signals indicative of the failure of the first display device, providing for display of second display data on a second display device, the second display device implemented within the display housing, the second display device overlaying at least a portion of the first display device, wherein the first and second display devices are configured to allow the first display data and the second display data to be displayed for viewing simultaneously, and wherein an entirety of the second display device overlays the first display device, the first display generating an image in a first direction and the second display includes a projector generating an image onto a viewing surface that is reflected from the viewing surface at least partially in the first direction, the viewing surface being defined by a surface of a transparent cover that is opposite to the first display device.

19. The method of claim 18, wherein the second display device comprises a transparent display device.

20. The method of claim 19, wherein the second display device is at least partially positioned within the display housing in both a laterally and vertically offset position from a center of the housing as viewed from a first direction with respect to a viewer of the display system.

\* \* \* \* \*